United States Patent
Hartmann

(10) Patent No.: US 9,354,929 B2
(45) Date of Patent: May 31, 2016

(54) SHUT DOWN REAL TIME DOMAIN WHEN LAST REAL TIME PROCESS TERMINATES ON A CORE

(75) Inventor: Wolfgang Hartmann, Aurachtal (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 183 days.

(21) Appl. No.: 14/118,026

(22) PCT Filed: May 17, 2011

(86) PCT No.: PCT/EP2011/057931
§ 371 (c)(1),
(2), (4) Date: Nov. 15, 2013

(87) PCT Pub. No.: WO2012/155963
PCT Pub. Date: Nov. 22, 2012

(65) Prior Publication Data
US 2014/0089930 A1    Mar. 27, 2014

(51) Int. Cl.
*G06F 9/46* (2006.01)
*G06F 9/48* (2006.01)
*G06F 9/50* (2006.01)

(52) U.S. Cl.
CPC ............ *G06F 9/4881* (2013.01); *G06F 9/4887* (2013.01); *G06F 9/5061* (2013.01)

(58) Field of Classification Search
None
See application file for complete search history.

(56) References Cited

U.S. PATENT DOCUMENTS

| 7,437,581 | B2* | 10/2008 | Grochowski et al. | 713/320 |
| 7,904,957 | B2* | 3/2011 | Imai | 726/22 |
| 2011/0072180 | A1* | 3/2011 | Lee | 710/260 |
| 2011/0087815 | A1 | 4/2011 | Kruglick | |

OTHER PUBLICATIONS

Wolf J. et al; RTOS Support for Parallel Execution of Hard Real-Time Applications on the MERASA Multi-Core Processor; Object/Compoonent/Service-Oriented Real-Time Distributest Computing (ISORC), 201013th IEEE Inernational Syposturn On, IEEE, Piscataway, NJ; pp. 193-201; ISBN: 978-1-4244-7083-9; XP031827212; 2010; US; Apr. 5, 2010.
Nojiri T. et al; Domain Partitioning Technology for Embedded Multicore Processors; IEEE Micro, IEEE Serviece Center, Los Alamitos, CA, US; vol. 29; No. 6; pp. 7-17; ISSN: 0272-1732; XP011299124; 2009; Nov. 1, 2009.
Schoeberl M. et al; Is Chip-Multiprocessing the End of Real-Time Scheduling?: Proceeding of the 9th Inernational Workshop on Worst-Case Execution Time Analysis (WCET'2009), Satallite Event to ECRTS¿ 09, Dublin, Ireland; pp. 1-11; http://vesta. infromatik. rwth-aachen.de/opus/vooltexte/2009/2288/pdf/Schoeber.2288.pdf; XP055053724; 2009; Jun. 30, 2009.
Bettie E. et al; Hard Real-Time Performances in Multiprocessor-Embedded Systems Using ASMP-Linux; Eurasip Journal on Embedded Systems; vol. 2008; pp. 1-16; ISSN: 1687-3955; DOI: 10.1155/2008/582648; XP55017567; 2008; Jan. 1, 2008.
Pitter CH. et al; A Real-Time Java Chip-Multiprocessor; ACM Transactions on Embeddes Computing Systems; vol. 10; No. 1; Article 9; pp. 1-34; ISSN: 1539.9087; DOI: 10.1145/1814539.1814548; XP55042152; 2010; AT; Aug. 1, 2010.

* cited by examiner

*Primary Examiner* — Wissam Rashid
(74) *Attorney, Agent, or Firm* — Henry M. Feiereisen LLC

(57) ABSTRACT

A host system includes a plurality of cores and is designed such that one real-time process and one core-local timer is run on each of the plurality of cores.

8 Claims, 2 Drawing Sheets

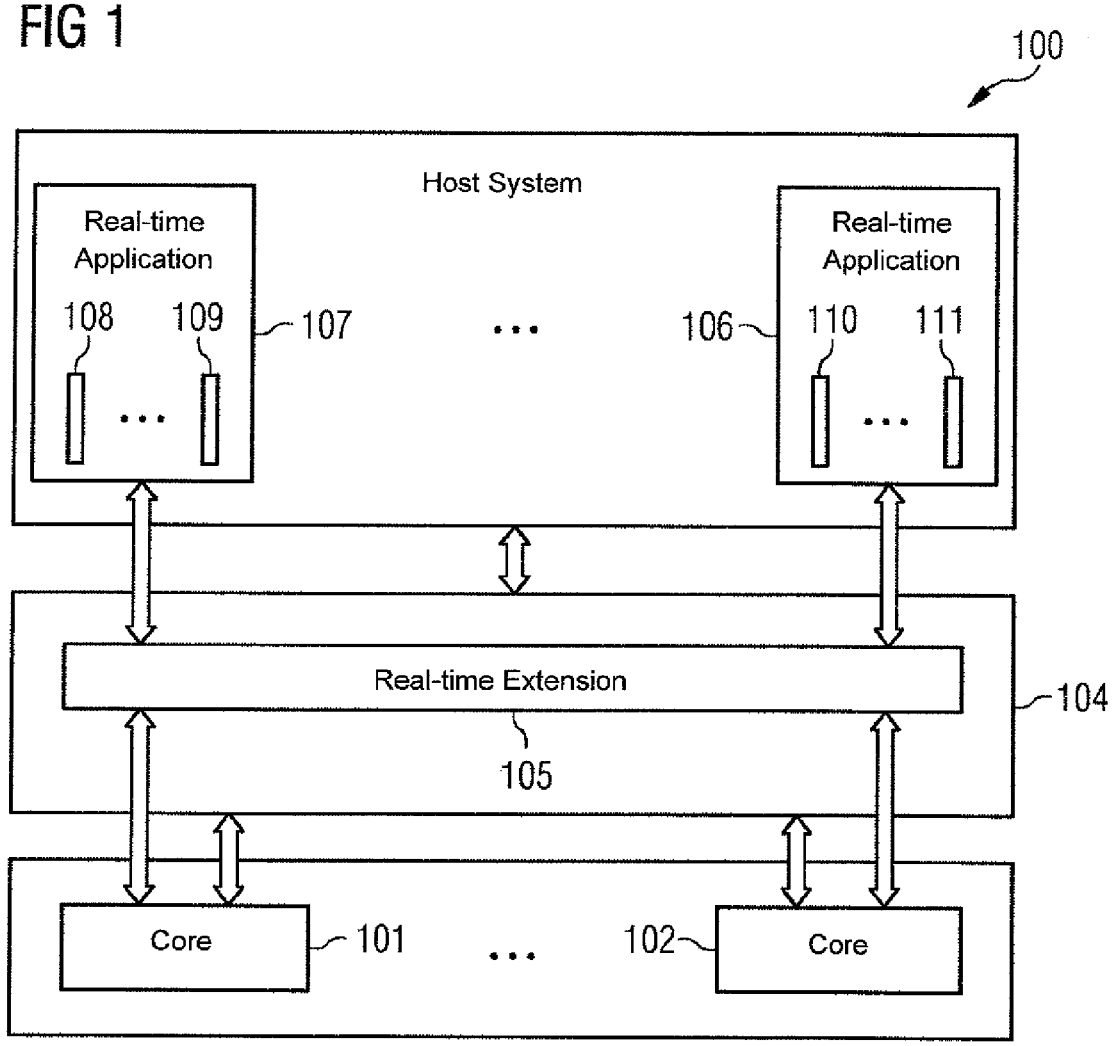

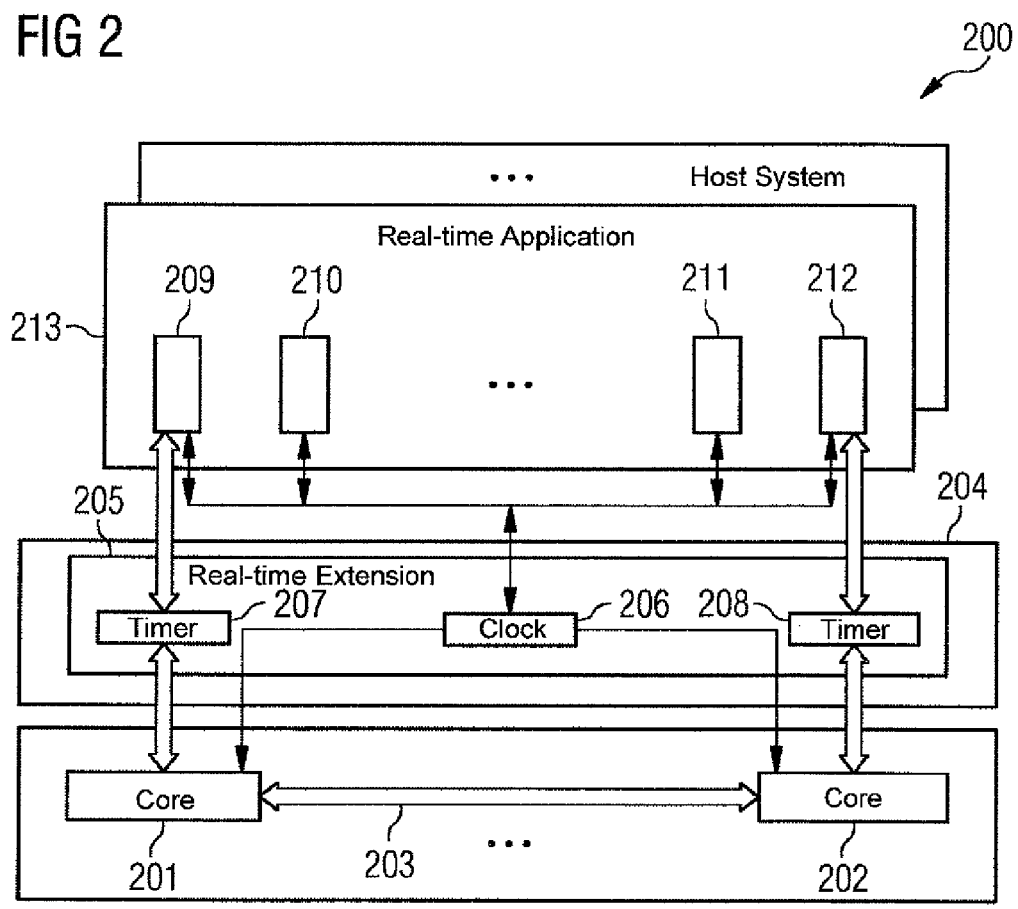

SHUT DOWN REAL TIME DOMAIN WHEN LAST REAL TIME PROCESS TERMINATES ON A CORE

CROSS-REFERENCES TO RELATED APPLICATIONS

This application is the U.S. National Stage of International Application No. PCT/EP2011/057931, filed May 17, 2011, which designated the United States and has been published as International Publication No. WO 2008/031536, pursuant to 35 U.S.C. 119(a)-(d).

BACKGROUND OF THE INVENTION

The invention relates to a host system, especially a host system having a real-time extension. Furthermore, the invention relates to a method for operating a host system. In addition, the invention relates to a program element and to a computer-readable medium.

In the processor and hardware development of computers, there is a general tendency towards ever-increased computing power. In the past, this was carried out especially also by means of increasing the clock frequencies of the processors. However, there are limits set to increasing the computing power of a processor by increasing the clock frequency especially due to the great increase in electrical power dissipation (heat generation) today. An increase by means of parallel processing (multicore system) becomes more economic. This applies not only to service systems but also to all other computer applications, e.g. also to industrial automation systems.

The demands in computing power increase continuously. Integrating motion control, programmable controllers (PLC) and human machine interfaces (HMI) in one device are a suitable task for a multicore architecture. Virtualization technology is also a further impulse for utilizing such systems.

In reality, the multiplied theoretical computing power (n-fold in the case of n cores) can never be achieved because in the distribution of software, especially of a real-time kernel from a single-core to a multi-core system, the old rules still apply with respect to the performance of the overall system:

The familiar rule "MIPS=k*memory bandwidth" means lastly that a high memory bandwidth requires local L2 caches with a higher number of cores.

Local caches cause Amdahl's Law to become effective which, in one formulation, is:

If additional processors are used, the advantages (more operating cycles) increase linearly, at the most, the costs (conflicts of access, serialization etc.) increase quadratically.

The performance of the system thus behaves as $C(n)=a \times n - b \times n^2$ where n number of processors or physical cores; this is because local caches unavoidably mean a greater factor of b. This applies especially to the distribution of a real-time solution to a number of cores which are necessary as part of real-time extensions. In the distribution of central common data such as, e.g., lists, queues (especially queues which are threaded twice, e.g. thread or timer management), counting is also necessary for the case that no access conflicts (non-contention case) occur, and this twice.

On the one hand, a spin lock (process synchronization, protects jointly used resources against modifying access) must be used as protection which, lastly, leads to an automatic RMW (read-modify-write) command which is a very expensive process with respect to the performance of the system because the cache must be blocked. If an RFO (read for ownership) cycle was also added, the negative influence on the performances would become even greater.

Changes in the delay invalidate the corresponding information in all other L2 caches and thus lead lastly to misses which have a very strong influence on the performance.

There are various solutions in existence for real-time extensions. One of these known solutions is Xenomai, a real-time extension for Linux, a further one is IntervalZero RTX®, a real-time extension for Windows.

Although, for example, Xenomai enables the real-time to be distributed to a number of cores, this solution contains the points described above which lead to a non-optimal performance. Such a real-time extension is to be described diagrammatically using the example of a standard kernel in multicore environment by means of FIG. 2.

FIG. 2 shows a host system or real-time system 200 which has a plurality of physical cores 201 and 202. Between the cores 201 and 202, the possibility of cross-core notifications is indicated diagrammatically by means of a double arrow 203, which notifications are used for providing signaling paths in which transmitter and receiver entities are located in different physical cores or processors are in different cores, respectively. In this respect, an inter-processor interrupt (IPI) is sent from one to the other core so that the function to be executed is executed by the other core by proxy.

Block 204 shows diagrammatically an operating system which provides a standard kernel having a real-time extension 205 integrated therein. The integrated real-time extension manages the global resources of the real-time system by means of a central accounting system. In this context, a synchronization is performed during access to the internal global data structures, using spin locks which are shown diagrammatically as global lock 206 in FIG. 2.

Furthermore, the operating system 204 provides real-time timers 207 and 208 for a plurality of real-time threads 209, 210, 211 and 212 which belong to a real-time application 213.

In order to be able to meet fundamental real-time requirements, no central timer chip is used in known multicore systems. The minimum is a core-specific timer management as is implemented also in Xenomai. Furthermore, it can be ensured, such as, for example, in the case of Xenomai, that in the case of a thread migration, a possible timer request also migrates. This makes it possible that, when a timer is triggered, the real-time thread to be woken runs in the same core which also has processed the timer interrupt.

Previously, however, no solutions are known which, in the case of a real-time extension, ensure by means of an optimum distribution of the software that a maximum performance gain and minimum latency periods are the result of a real-time solution distributed over a number of cores.

SUMMARY OF THE INVENTION

It is thus the object of the invention to create a host system having a real-time extension which is optimized with regard to the latency periods and/or the performance.

This object is achieved by a host system, a method for operating a host system, a computer program element and by a computer-readable medium as claimed in the independent patent claims. Further embodiments are specified in the dependent claims.

According to one exemplary aspect, a host system having a plurality of cores is created which is configured in such a manner that one real-time process and one core-local timer is run on each of the plurality of cores.

That is to say, for each of the plurality of cores, a separate real-time process is started. For each of the plurality of cores, a separate core-local timer is also started. Providing separate core-local timers enables core-local signaling paths to be used for the entire time management which, in turn, ensures that no or at least fewer cross-core notifications, i.e. notifications between different cores of the host system are needed. In particular, such core-local timers are used instead of a centrally used timer, e.g. an HPET timer. For example, the core-local timer can be implemented by means of an LAPIC timer when using Linux as operating system.

According to another aspect of the invention, a method for operating a host system having a real-time extension is created, the host system having a plurality of cores, wherein the method has operating one real-time process per core of the plurality of cores and has operating one core-local timer per core of the plurality of cores.

In particular, the term "operating" is also understood to mean starting the real-time process and/or the core-local timer.

According to another embodiment of the invention, a program element is created which is configured in such a manner that, when it is executed on a processor, it controls a method according to an exemplary aspect of the invention.

According to a further exemplary aspect of the invention, a computer-readable medium is created on which a computer program is stored, the computer program being configured in such a manner that, when it is executed on a processor, it controls a method according to an exemplary aspect of the invention.

A basic concept of one exemplary aspect is a host system having a real-time extension in which it is made possible to reduce the number of cross-core notifications or to eliminate these entirely by providing at least one real-time process and one core-local timer per core. For example, the number of cross-core notifications can be reduced since time-management by means of core-local signaling paths is provided for when using core-local timers. This leads to the latencies and to the overall performance of the host system being optimized.

In the text which follows, exemplary embodiments of the host system will be described. However, the corresponding embodiments and features also apply to the method for operating a host system, the program element and the computer-readable medium.

According to one exemplary embodiment, the host system is configured in such a manner that core-local interrupt blocks can be used.

In particular, these core-local interrupt blocks can be used or provided instead of spin locks, or replace the latter. As a result, with the partitioning of, in particular, data structures, e.g. core-local queues for real-time run queue or for timer handling, the use of spinlocks becomes superfluous. The use of core-local interrupt blocks is thus sufficient or ensures synchronization during an access to resources of the host system which are installed or run on the host system.

According to another exemplary embodiment, the host system is configured in such a manner that core-local signaling paths are implemented.

In particular, core-local signaling paths may be understood to mean that transmitter and receiving entities run along the same core. For example, the core-local signaling paths can be logical paths, i.e. formed by means of software. In particular, interrupts of real-time assemblies are always linked to the core on which the corresponding real-time application is also running which is notified by the corresponding interrupt. As a result, cross-core notifications become preventable.

According to another exemplary embodiment, the host system is configured in such a manner that a process-specific management of data structures is provided for, i.e. a process-specific management or illustratively accounting of different, hitherto typically globally managed data structures is possible. Examples of such data structures are, in particular, a real-time task list or Futex header in the case where an operating system of the host system is a Linux operating system. This may be an organizational measure for improving or providing for a distribution of real-time processes or applications to a number of cores. Apart from a process-specific management of data structures which is performed core-locally, it may be preferred or also necessary for the management of all real-time processors in the overall system to continue to use spin locks. In specific exemplary embodiments, in particular, global data structures may still be protected by spin locks. In this context, it should be noted, however, that these spin locks are not a component of real-time critical tasks since access is only necessary when registering or shutting down a real-time process.

As a result, it is possible to support a number of real-time applications.

According to another exemplary embodiment, the host system is configured in such a manner that on starting a real-time-capable system by means of an associated real-time-capable process, a real-time domain allocated to the real-time-capable system is set up when the associated real-time-capable process is the first real-time-capable process which is started on the corresponding core of the host system.

A separation between the starting of a real-time process and the setting up of a real-time domain takes place, especially a real-time domain can always be installed on demand. In this context, the installation may be carried out only by the first real-time process which is or has been started on the corresponding core.

According to another exemplary embodiment, the host system is configured in such a manner that a shutdown of the real-time domain takes place when the last real-time process is terminated, which is executed on the corresponding core.

According to a further exemplary embodiment, a migration of a real-time process which runs on one of the plurality of cores, to another one of the plurality of cores is prevented.

In particular, a real-time process or real-time-thread can thus always be performed on the core which is specified by an application or the real-time system for this real-time process or real-time thread and thus an implicit migration of real-time threads to another core is not supported. This will eliminate load balancing, but will lead to a number of real-time-capable processes occurring on a host system without real-time/performance losses compared with a system having only one real-time process. Such an elimination of migration, i.e. also an elimination of a load balancing provides especially for an enhancement of performance in that the management expenditure is reduced which is associated with cross-core notifications.

In summary, one exemplary aspect is seen in the fact that a host system is created which enables a number of real-time-capable processes to be created in a host system without real-time/performance losses occurring compared with a system having only one real-time process or these are reduced, at least. The host system may be a Linux system or a Windows system or a system on which an arbitrary other operating system is installed. In particular, the optimized performance is achieved by the fact that for each core, a real-time process is started with an automatic, but fixed allocation of the resources to the local flow management of the threads, e.g. interrupt sources, timers, lists, queues of the real-time process;

core-local or core-specific timers are used instead of central hardware timers;

starting up or shutting down of individual real-time processes are performed instead of starting up or shutting down the entire real-time system.

A real-time extension is provided for, having shorter response times and faster thread communication/synchronization for more than one process in the case of a multi-core application.

In particular, it is possible to reduce or to prevent impairment of the performance by cross-core notifications. In the prior art, these occur whenever a signaling path (from the transmitter entity to the receiver entity) is not core-local or is core-local since then a core sends an inter-processor interrupt (IPI) to another core so that the function to be executed is executed by proxy on the other core.

Advantageously, latencies are reduced which must be observed during the distribution of interrupts. In particular, it is prevented in the host system described or by the software which runs on this host system that signaling by an interrupt on a first processor (CPUx) leads to the thread to be woken being located on a second processor (CPUy). It is thus prevented that the notification does not take place directly but must be initiated via a cross-core notification which would lead to greater latencies.

In the prior art, furthermore, the necessity of a cross-core notification can arise in the real-time thread communication when transmitter and receiver thread are located in different cores or when transmitter and receiver are located in different cores during an I/O event. These cross-core notifications may also be reducible or preventable in a host system according to the exemplary aspect when core-local signal paths and/or core-local timers are used. By providing core-local signal paths and/or interrupt blocks, it is possible to reduce the necessity or frequency of spin locks or global kernel locks by means of which most of the data structures are protected, which global kernel locks have a particularly negative effect on the scalability of multi-core systems in the case when many active cores are used for the real-time system.

According to the embodiment according to the exemplary aspect, all queues remain core-local, and can be protected by means of local interrupt blocks, in the case where a Linux operating system is used, with the exception of POSIX message queues. Since the POSIX message queues are used for communication between processors (Linux and/or real-time), these will continue to be synchronized also by using spin locks. For Futexes, in the case of Linux, it may be applicable that—as in the single-core solution—only private (process-local) Futexes are supported. There will thus not be any recalculation to physical addresses as a result of which semaphore functions become particularly fast.

BRIEF DESCRIPTION OF THE DRAWING

The aspects and exemplary embodiments explained above and further exemplary aspects and exemplary embodiments will become more comprehensible to the expert by means of the exemplary embodiments explained in the text which follows. It should also be noted that features which are described above in conjunction with a particular exemplary aspect or exemplary embodiment can also be combined with other exemplary aspects and exemplary embodiments.

FIG. 1 shows a diagrammatic representation of a host system according to one exemplary embodiment.

FIG. 2 shows a diagrammatic representation of a host system according to the prior art.

DETAILED DESCRIPTION OF PREFERRED EMBODIMENTS

The representations in the figures are diagrammatic. Identical or similar components or elements in the various figures are provided with identical or similar reference symbols.

In the text which follows, an exemplary embodiment is described by means of the Linux-based AuDis real-time extension of multicore systems, wherein it is avoided in the real-time extension by means of a dedicated distribution and adaptation of the real-time software that the performance does not increase optimally in the case of an increased number of cores. In principle, however, the principles can be transferred to any other real-time extension in order to thus optimize the real-time characteristic or the performance in the case of a distributed real-time solution.

FIG. 1 shows a diagrammatic representation of a host system 100 according to one exemplary embodiment. The host system has a plurality of physical cores 101 and 102, only two of which are shown for the sake of clarity. In contrast to the host system shown in FIG. 2, no possibility of cross-core notifications is indicated between cores 101 and 102. Block 104 diagrammatically shows an operating system, e.g. Linux which provides a standard kernel with a real-time extension 105 integrated therein. The integrated real-time extension manages the global resources of the real-time system by means of a central accounting system.

Furthermore, FIG. 1 shows a plurality of real-time applications 106 and 107 within which a number of threads 108, 109, 110 and 111 can be processed. The real-time applications are a part of all regular processes which are processed.

It should be noted that the number of cores and the number of threads are naturally not restricted to the number shown but can be adapted depending on embodiment and requirement.

In one exemplary embodiment, one real-time process is provided per core. In a configuration such as it is shown diagrammatically in FIG. 1, it is also possible to extend a host system to a number of real-time processes without having to perform trade-offs in latency times/performance for the individual process. If the host system has sufficient physical cores, an exclusive core utilization by the real-time application can also be set. Standard Linux and its user programs are then banned from this core and the maximum latency period will be reduced further since a change of address space is prevented.

The measures described, i.e. the provision of core-local interrupt blocks, core-local signal paths and/or core-local timers are usually implemented in central routines and can thus be changed easily as part of a kernel generation. Thus, if maximum flexibility is demanded in the distribution of the tasks and not the best-possible real-time characteristic, the following allocations can also be achieved with little additional expenditure.

In a specific exemplary embodiment, a real-time process is executed with threads in a number of cores. In this context, the real-time process is started in one core, where a user, by setting a core affinity for real-time threads can achieve that a real-time thread is executed on a particular core. In this case, local interrupt blocks may be sufficient if it is a matter of synchronizing core-local queues. However, in this application, signaling paths are passed which need synchronization with spin locks for process-specific queues. In this context, signaling paths can also be produced which are no longer core-local such that the necessity of a cross-core notification arises.

In another exemplary embodiment, a number of real-time processes are implemented with threads in a number of cores.

In this context, the most general case of distribution of a real-time task is achieved. The real-time threads of a real-time application are executed on any core but this characteristic can be utilized by a number of real-time applications.

In the previous single-core solution on a Linux system, checking for a necessary change in address space is only necessary during the transition between Linux domain and real-time domain. If, however, a number of real-time processes are supported on one core, this check must also be performed for the thread change within the real-time domain. This scheme would also include the possibility that a number of real-time processes can be started on a single-core system.

The execution of the invention is not restricted to these applications and the system configurations mentioned further above but also possible in a multiplicity of modifications which are within the scope of competent action. It should also be pointed out that reference symbols in the claims are not to be considered to be restrictive and that the terms "have" or "having" and similar terms do not exclude the presence of other elements or steps. An enumeration as a number of means or elements also does not exclude the possibility that these means or elements can be designed as a single means or element.

The invention claimed is:

1. A real-time-capable host system comprising a plurality of cores, wherein each of the cores is configured to execute a real-time process and a core-local timer,
   wherein a real-time domain associated with real-time-capable system is set up when a real-time-capable system is started by an associated real-time process, provided that the associated real-time process is the first real-time process started on a corresponding core of the real-time-capable host system, and
   wherein the real-time-capable host system is configured to shut down the real-time domain when a last real-time process processed on the corresponding core terminates.

2. The real-time-capable host system of claim 1, wherein an inter-processor interrupt is sent from one core to another core so as to enable a function to be executed by the one core is executed by the other core.

3. The real-time-capable host system of claim 1, wherein the core-local timers in each of the cores enable core-local signaling paths to be used for time management.

4. The real-time-capable host system of claim 1, wherein the real-time-capable host system is configured to enable process-specific management of data structures.

5. The real-time-capable host system of claim 1, wherein the real-time-capable host system is configured to prevent a real-time process running on one of the plurality of cores from migrating to another one of the plurality of cores.

6. A method for operating a real-time-capable host system comprising a plurality of cores and a real-time extension, the method comprising:
   operating one real-time process in each core of the plurality of cores; and
   operating one core-local timer in each core of the plurality of cores,
   wherein a real-time domain associated with real-time-capable system is set up when a real-time-capable system is started by an associated real-time process, provided that the associated real-time process is the first real-time process started on a corresponding core of the real-time-capable host system, and
   wherein the real-time-capable host system is configured to shut down the real-time domain when a last real-time process processed on the corresponding core terminates.

7. A computer program stored on a non-transitory computer-readable medium, wherein when the computer program is read into a memory of a real-time-capable host system comprising a plurality of cores and a real-time extension and executed by a processor of the real-time-capable host system, the computer program causes the real-time-capable host system to
   operate one real-time process in each core of the plurality of cores; and
   operate one core-local timer in each core of the plurality of cores,
   wherein a real-time domain associated with real-time-capable system is set up when a real-time-capable system is started by an associated real-time process, provided that the associated real-time process is the first real-time process started on a corresponding core of the real-time-capable host system, and
   wherein the real-time-capable host system is configured to shut down the real-time domain when a last real-time process processed on the corresponding core terminates.

8. A non-transitory computer-readable medium on which a computer program is stored, wherein when the computer program is read into a memory of a real-time-capable host system comprising a plurality of cores and a real-time extension and executed by a processor of the real-time-capable host system, the computer program causes the real-time-capable host system to
   operate one real-time process in each core of the plurality of cores; and
   operate one core-local timer in each core of the plurality of cores,
   wherein a real-time domain associated with real-time-capable system is set up when a real-time-capable system is started by an associated real-time process, provided that the associated real-time process is the first real-time process started on a corresponding core of the real-time-capable host system, and
   wherein the real-time-capable host system is configured to shut down the real-time domain when a last real-time process processed on the corresponding core terminates.

* * * * *